United States Patent [19]

Burner et al.

[11] Patent Number: 5,784,426
[45] Date of Patent: Jul. 21, 1998

[54] BOTTOM OPEN SLED SYSTEM

[75] Inventors: James Edgar Burner, Downingtown; Benedict Kazirskis, Barto, both of Pa.

[73] Assignee: General Electric Company, Schenectady, N.Y.

[21] Appl. No.: 801,710

[22] Filed: Feb. 14, 1997

Related U.S. Application Data

[63] Continuation of Ser. No. 561,481, Nov. 20, 1995, abandoned.

[51] Int. Cl.⁶ .................................................. G21C 19/20
[52] U.S. Cl. ............................................................ 376/260
[58] Field of Search ................................................ 376/260

[56] References Cited

U.S. PATENT DOCUMENTS

| | | | |
|---|---|---|---|
| 3,851,906 | 12/1974 | Frisch et al. | 376/263 |
| 4,060,452 | 11/1977 | Acher | 376/232 |
| 4,288,290 | 9/1981 | Saima et al. | 376/260 |
| 4,292,133 | 9/1981 | Sasaki et al. | 376/260 |
| 4,585,611 | 4/1986 | Perl | 376/260 |
| 4,728,484 | 3/1988 | Kodama et al. | 376/260 |
| 4,801,422 | 1/1989 | Turner et al. | 376/260 |
| 4,973,443 | 11/1990 | Larson et al. | 376/260 |
| 5,169,593 | 12/1992 | Kazirskis et al. | 376/260 |
| 5,426,680 | 6/1995 | Willems | 376/258 |

*Primary Examiner*—Daniel D. Wasil
*Attorney, Agent, or Firm*—Armstrong, Teasdale, Schlafly & Davis

[57] ABSTRACT

A bottom open sled system for exchanging control rod drives in a nuclear reactor is described. The system, in one form, includes a tower forming a control rod drive receiving area. At least one acme screw extends substantially the length of the tower and is mounted within the receiving area. An elevator is coupled to the acme screw and is movable relative to the acme screw. The elevator is configured to engage a portion of the control rod drive and to substantially support the control rod drive. The system further includes a trunnion cart engaged to the tower so that the tower is rotatable relative thereto.

28 Claims, 8 Drawing Sheets

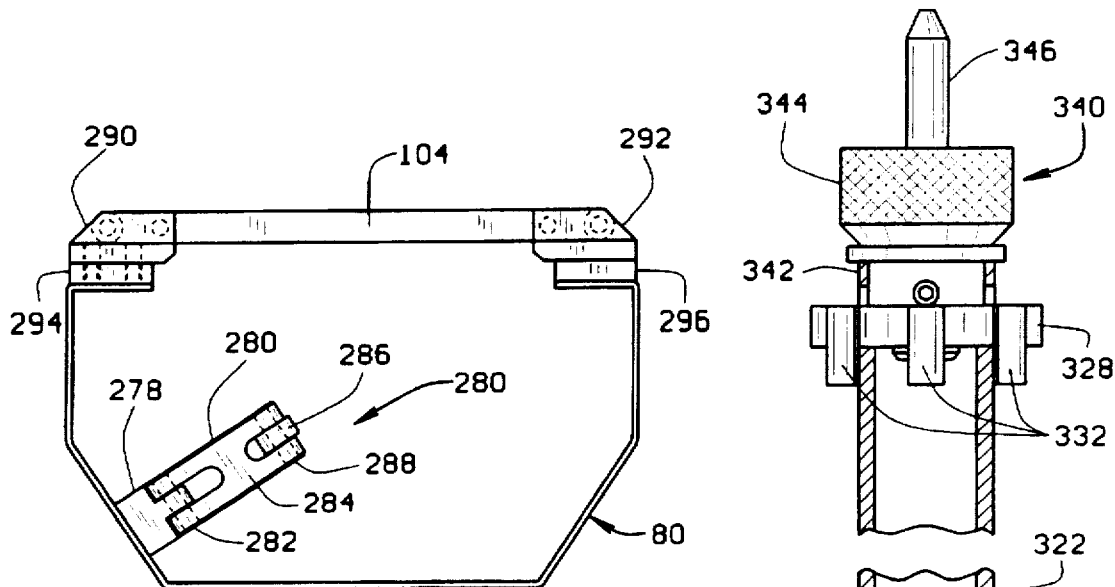
FIG. 10
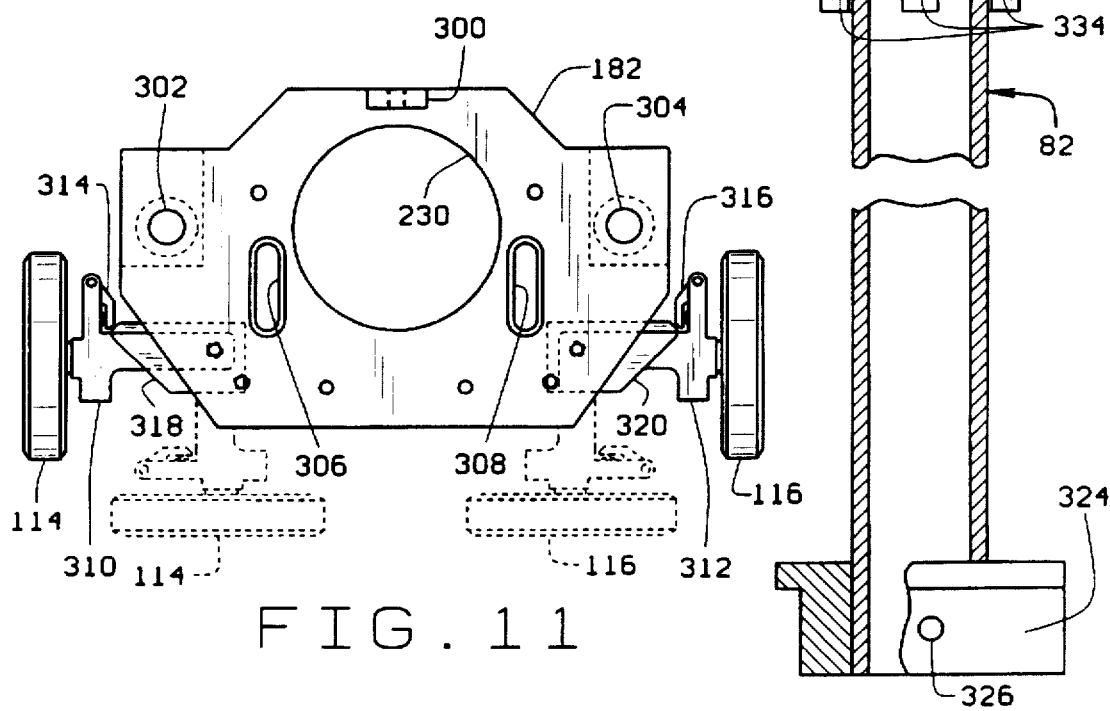
FIG. 11
FIG. 12

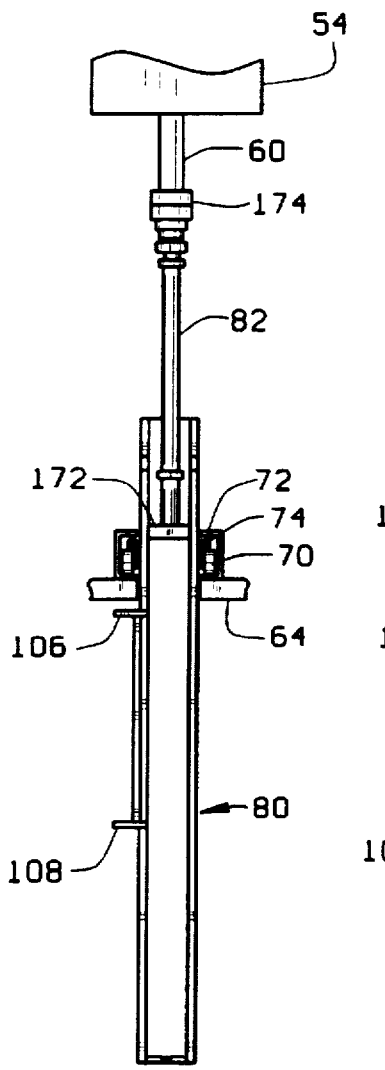
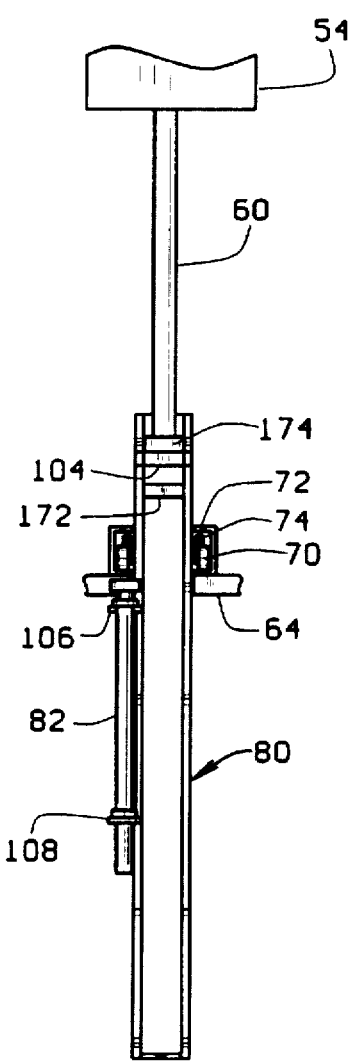
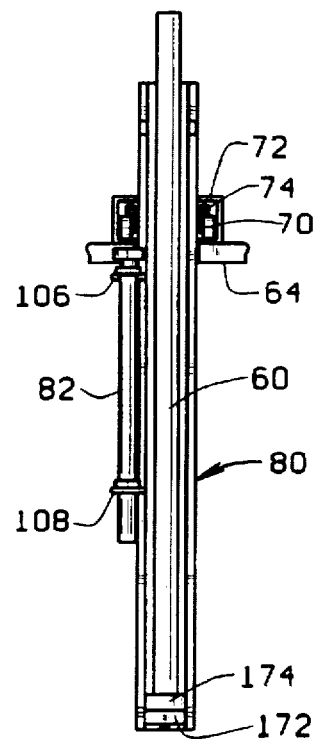
FIG. 19
FIG. 20
FIG. 21
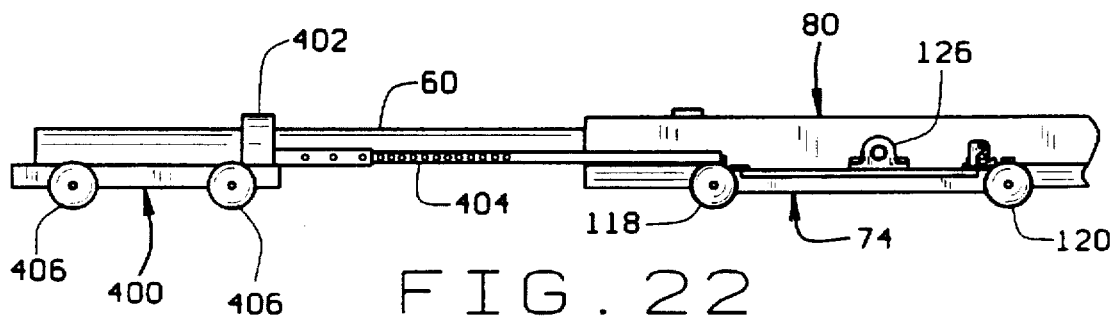
FIG. 22

BOTTOM OPEN SLED SYSTEM

This application is a continuation of application Ser. No. 08/561,481 filed on Nov. 20, 1995, now abandoned.

FIELD OF THE INVENTION

This invention relates generally to nuclear reactors and, more particularly, to removing and installing control rod drives (CRDs) in a nuclear reactor.

BACKGROUND OF THE INVENTION

Control rod drives are used in a nuclear reactor to control the position of the control rods within the reactor core. The control rod drives (CRDs) typically extend from a CRD housing connected to the reactor pressure vessel into the under vessel area.

CRDs sometimes are removed for maintenance and repair. Subsequent to servicing, the CRDs are reinstalled. CRDs must, of course, be raised and lowered in a safe and controlled manner so that the CRDS are not dropped or allowed to contact adjacent equipment in a manner that could cause damage. In addition, once the CRD is removed from its housing, the CRD should be safely rotated from a vertical position to a horizontal position, and the CRD should be secured to the removal equipment for transport out of the under vessel area. These activities should be performed by a minimum number of personnel and accomplished quickly and efficiently to reduce radiation exposure.

One known method for exchanging a CRD is to attach an extension tube to the bottom of the CRD and thread a cable over a stationary idler pulley and through the bottom of the extension tube. The cable is secured to a static hanger. A winch then pays out the cable and the CRD is lowered until the extension tube contacts the floor of the under vessel area. A second cable winch is then employed to secure a clamp around the CRD at the approximate mid-length of the CRD. With the second winch securing the weight of the CRD, an operator is required to enter the basement of the under vessel area to remove the extension tube. The second cable winch then pays out cable until the CRD is out of the housing.

Once the CRD is out of the housing, the CRD is then manually positioned from the vertical position to a horizontal position as the second winch lifts the CRD up to the equipment platform. When the CRD is above the lower track, or rail, on the equipment platform, a transport cart is rolled into position under the horizontal CRD. The second winch then pays out the cable to land the CRD on the cart. The cable rigging is removed from the CRD, and the cart with the CRD is pulled out of the under vessel area.

This known method is very complex to perform, time consuming and if not properly executed, can result in dropping the CRD onto the floor of the under vessel area. In addition, with this known method, operating personnel radiation exposure also may be high and productivity may be low.

Another known system for removing a CRD is a rigid tower system which allows the CRD to be lowered into a tower supported by a trunnion cart. The CRD is raised and lowered by an elevator secured within the tower. The known tower systems use either roller chains, cable or hydraulic cylinders, and employ built in air or hydraulic motors with supply and control (air) logic and hydraulic lines to raise and lower the elevator tower.

Once the CRD is completely out of the CRD housing, the rigid tower system employs a second winch or hoist which rotates the CRD and tower as a rigid assembly from vertical to horizontal. The trunnion cart allows the tower with the CRD to be rotated. In most cases, the tower with the CRD is then removed from the under vessel area. Otherwise, the CRD is lowered out of the tower when horizontal onto a separate transport cart.

The known tower systems are less complex to use than the known cable winch system and maintain much more control of the CRD to prevent accidental dropping. Existing rigid tower systems, however, have two inherent problems. First, the rigid tower and CRD combined length is such that rotation of the CRD tower combination is difficult and sometimes impossible in plants with limited floor clearance. Also, existing rigid tower drive motors present reliability and maintenance problems.

The first problem results because the known rigid tower systems add to the length of the CRD. Interferences prevent the use of the existing rigid tower systems where clearance is limited due to equipment located on the floor. In these instances, the above described cable winch system is employed for CRD exchange.

The second problem with known rigid tower systems, as explained above, is that the built-in drive motors can be difficult and time consuming to replace if failure occurs during CRD exchange. The supply and control lines are also subject to damage and failure causing down time and high maintenance costs. Since the motors are usually on the bottom of the tower, the motors are also subject to failure in the case of under vessel area flooding.

Accordingly, it is desirable to provide a CRD exchange which enables raising and lowering CRDs in a safe and controlled manner so that the CRDs are not dropped or allowed to contact adjacent equipment in a manner that could cause damage. In addition, it also is desirable to provide a CRD exchange which enables safely rotating CRDs from a vertical position to a horizontal position, and securing the CRD to removal equipment for transport out of the under vessel area. These activities preferably are accomplished quickly and efficiently to reduce radiation exposure and in a manner which requires a minimum number of personnel. Further, and when the above objectives are satisfied with a rigid tower type CRD exchange, it is desirable to provide a tower which has a CRD combined length which enables rotation of the CRD tower combination even in plants with limited floor clearance and also which overcomes the reliability and maintenance problems of tower drive motors.

SUMMARY OF THE INVENTION

These and other objects and advantages are attained by a bottom open sled (BOS), or CRD exchange, system which can be used to remove and replace a CRD even with minimum clearance between the bottom of the installed CRD and the floor of the under vessel area. The BOS system includes a stainless steel sheet metal tower having two timing belt synchronized parallel acme screws. The acme screws drive a tower elevator which raises and lowers the CRD for installation and removal.

The acme screws are powered by a standard angle wrench which is manually engageable to the top of either acme screw. Since the air powered angle wrench is only used for CRD installation and removal, there is no need for permanent air lines, fittings and disconnects to be attached and routed on the tower housing.

The acme screws and timing belt assembly also does not have the reliability and maintenance problems of known tower drive motors. In addition, by using a standard angle wrench to drive the elevator, in the event that the angle wrench fails, the operator can simply use a back-up angle wrench rather than having to attempt to repair a tower drive motor.

With respect to the length of the combined CRD tower assembly, an opening in the tower housing end plate allows the ring flange end of the CRD to penetrate through the bottom of the tower as the CRD is lowered for removal and transport. This construction results in the BOS system and CRD combination being no longer in length than a CRD by itself.

The synchronized acme screws enable a CRD to be easily raised and lowered in a safe and controlled manner. Since the acme screws cannot be back driven, no brakes or interlocks are required in case of loss of power. Also, with the subject rigid tower, it is possible to safely rotate CRDs from a vertical position to a horizontal position, and secure the CRD to removal equipment for transport out of the under vessel area. These activities can be accomplished quickly and efficiently to reduce radiation exposure and in a manner which requires a minimum number of personnel.

BRIEF DESCRIPTION OF THE DRAWINGS

FIG. 10 is a top view of the bottom open sled system tower with some parts cut away.

FIG. 11 is a plan view of the bottom open sled system tower end plate.

FIG. 12 is a side view of an extension tube used in the bottom open sled system.

FIG. 19 illustrates lowering a CRD into the tower of the bottom open sled using the extension tube shown in FIG. 12.

FIG. 20 illustrates a CRD lowered into the top section of the bottom open sled system tower.

FIG. 21 illustrates a CRD fully lowered into the bottom open sled system tower.

FIG. 22 is a side view of a CRD loaded into the bottom open sled system and ready for transport from the under vessel area.

DETAILED DESCRIPTION OF THE DRAWINGS

Figure 1:
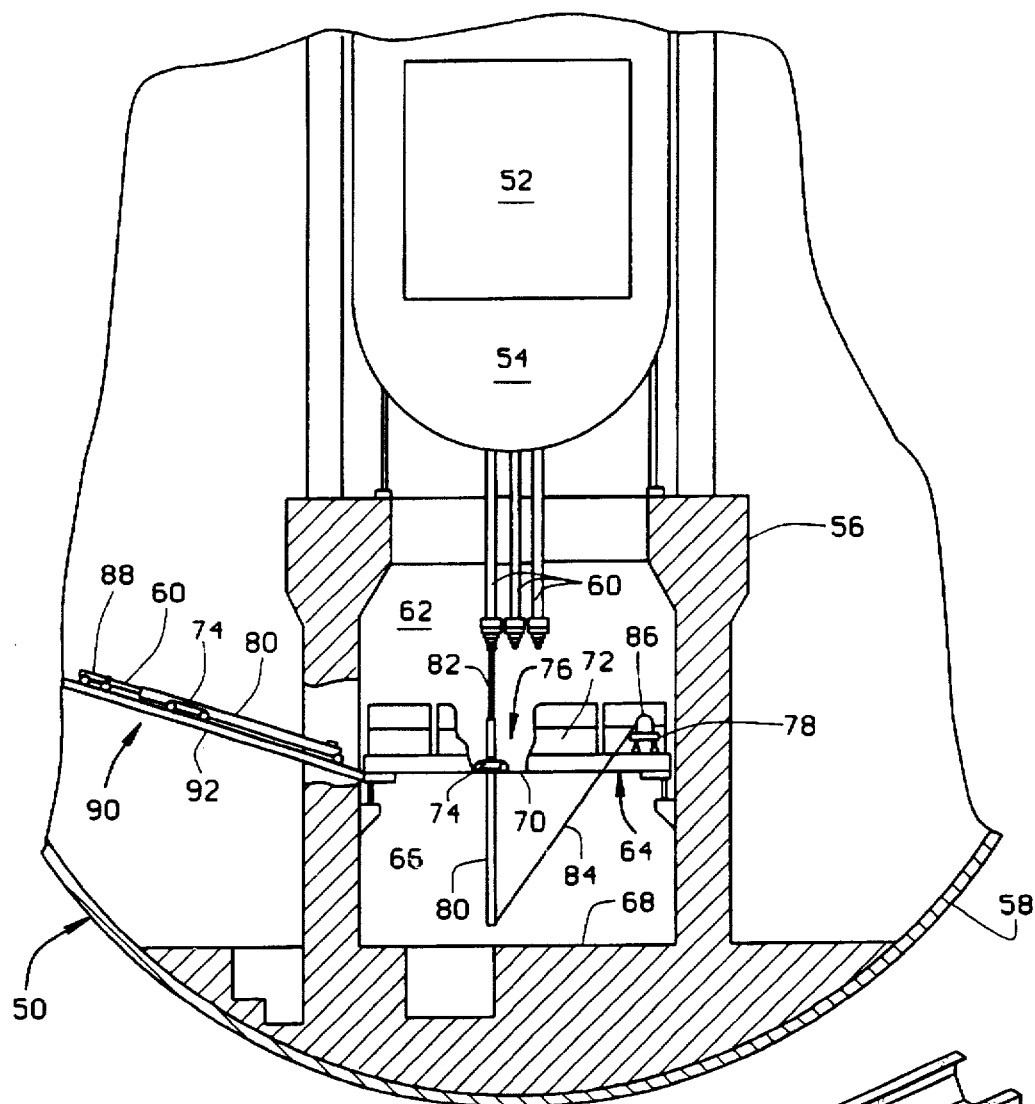
FIG. 1 is a partial cross section view of a nuclear reactor showing certain reactor components and a control rod drive exchange system, sometimes referred to as a bottom open sled, in accordance with one embodiment of the present invention.

FIG. 1 is a cross section view of a boiling water nuclear reactor 50 including a reactor core 52 positioned within a reactor pressure vessel 54. Reactor pressure vessel 54 is supported by a reactor pressure vessel support structure 56 housed within a containment 58. A plurality of control rod drives 60 extend from reactor pressure vessel 54 and into an under vessel area 62. A control rod drive (CRD) equipment platform 64 is located below reactor pressure vessel 54, and a basement 66 is located below equipment platform 64. A floor 68 is located at the bottom of basement 66.

With respect to CRD equipment platform 64, platform 64 includes two rails 70 and 72. A trunnion cart 74 of a bottom open sled (BOS) system 76 in accordance with one embodiment of the present invention is located on lowermost rail 70. A winch cart 78 is located on uppermost rail 72.

A tower 80 extends from, and is rotatably secured to, trunnion cart 74 into basement 66 and towards CRDs 60. Tower 80 is shown in FIG. 1 as being aligned with one CRD 60, and an extension tube 82 extending from an upper section of tower 80 to CRD 60. A cable 84 extends from a lower section of tower 80 to a winch 86 mounted on winch cart 78.

As described below in more detail, winch 86 is used to raise and lower tower 80 from a vertical position to a horizontal position. More particularly, once CRD 60 is loaded into tower 80 when in the vertical position, tower 80 is raised to the horizontal position by winch 86, and with the aid of a lead cart 88, the combination CRD tower assembly as shown at 90, is removed from under vessel area 62 by rolling the assembly up a transfer chute 92.

The foregoing description provides an overview of BOS system 76. The following sections describe the components of system 76 in more detail.

Rigid Tower Assembly

Figure 2:
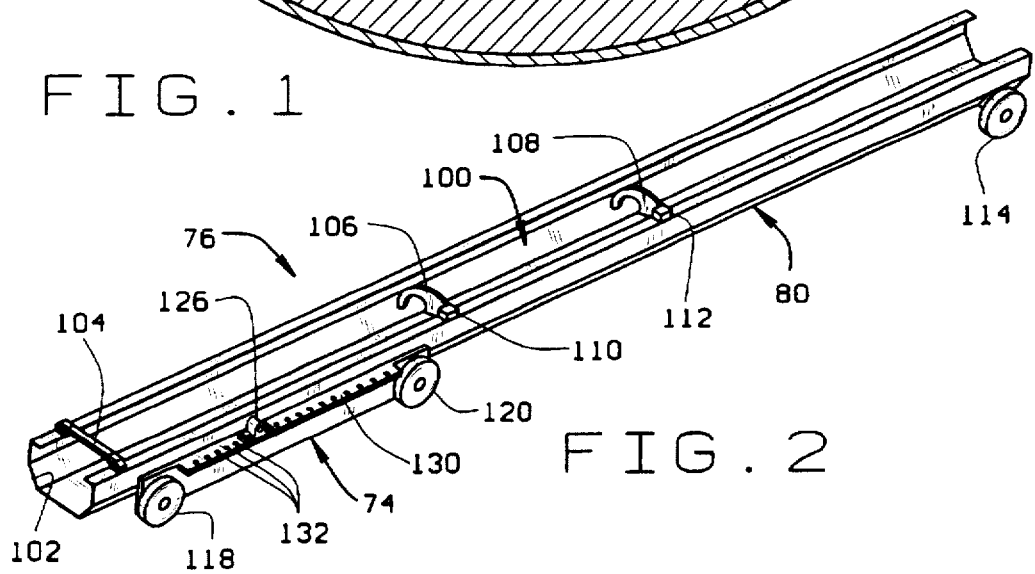
FIG. 2 is a perspective view of a bottom open sled system with some parts removed.

FIG. 2 is a perspective view of tower 80 and trunnion cart 74 of BOS system 76 with some parts removed. As shown in FIG. 2, tower 80 has a substantially open face 100 and includes an open top trough 102. Tower 80 is fabricated, in one embodiment, from one piece of ten gauge stainless steel sheet metal. A load transfer bar 104 is slidably secured to tower 80 and, as explained hereinafter, is utilized when removing extension tube 82 (FIG. 1) from a CRD when lowering the CRD into tower 80. Hanger brackets 106 and 108 are secured to hanger bracket mounts 110 and 112, respectively. Brackets 106 and 108 are rotatable relative to tower 80 and are used for storing extension tube 82 for convenient and quick installation and removal.

At the end of tower opposite load transfer bar 104, flip-up wheels 114 and 116 (only wheel 114 is visible in FIG. 2) are attached to tower 80. Flip-up wheels 114 and 116 are used for transporting tower 80. Also, trunnion cart 74 includes wheels 118, 120, 122 and 124 (only wheels 118 and 120 are visible in FIG. 2) secured thereto. Pillow blocks 126 and 128 (only pillow block 126 is visible in FIG. 2) are secured to cart 74 and tower 80 is rotatable about blocks 126 and 128, as hereinafter described in more detail, so that tower 80 may rotate relative to cart 74. Pillow block 126 is threadedly engaged to side bar 130, and the location of pillow block 126 is adjustable by selecting appropriate openings 132 in bar 130 for engagement therewith.

Figures 3, 4:
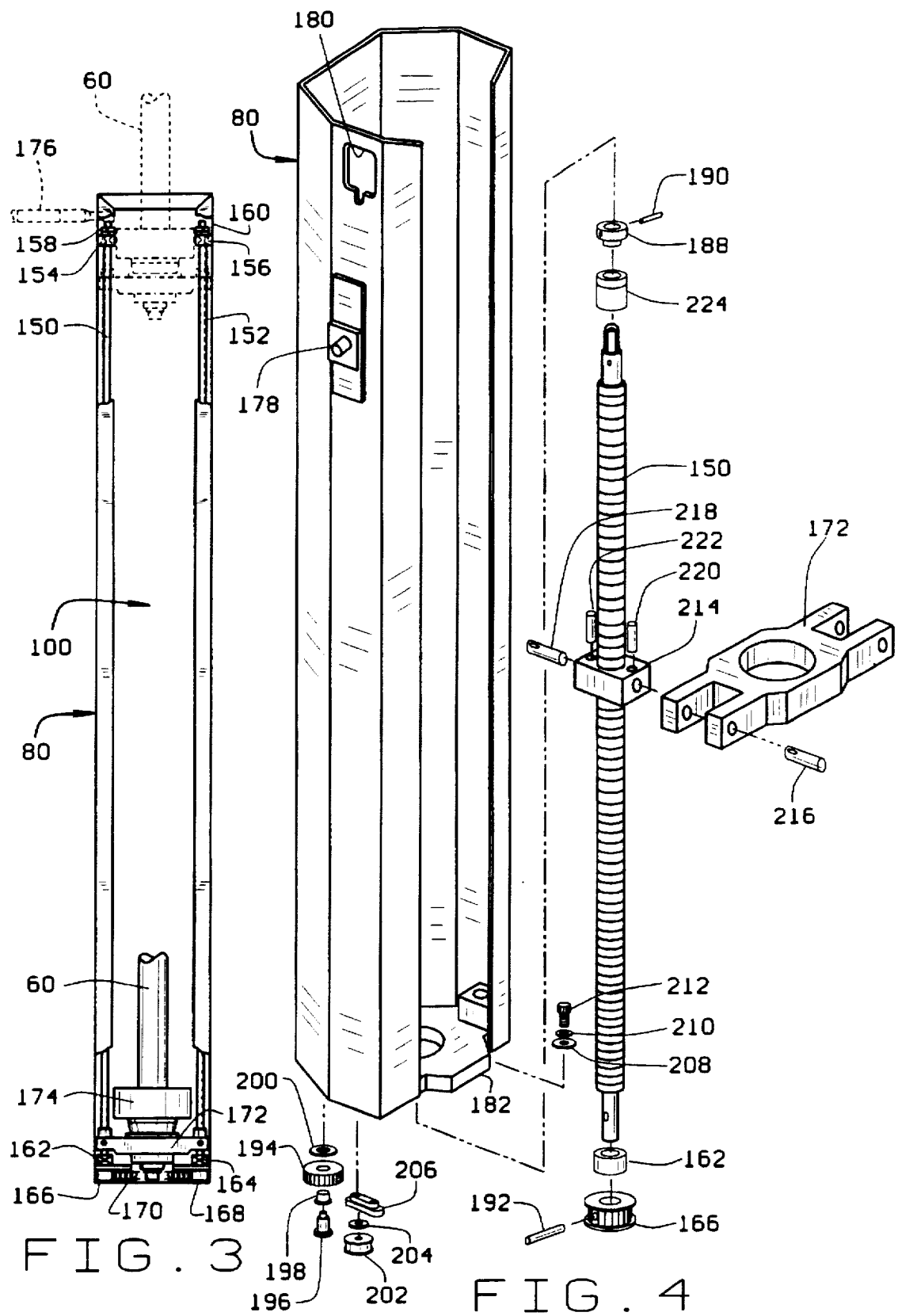
FIG. 3 is a front partial cross section view of the tower of the bottom open sled system.
FIG. 4 is a perspective exploded view with parts cut away of the bottom open sled system tower.

FIG. 3 is a front partial cross section view of BOS system tower 80. As shown in FIG. 3, acme screws 150 and 152 are secured within tower 80. More specifically, at an upper section of tower 80, acme screws 150 and 152 extend through radial thrust bearings 154 and 156, respectively, and drive hex nuts 158 and 160 are located at the top of each acme screw 150 and 152, respectively. At a lower section of tower 80, acme screws 150 and 152 extend through double row needle roller bearings 162 and 164. Timing pulleys 166 and 168 and a timing 170 belt are coupled to acme screws 150 and 152, respectively.

An elevator 172 is coupled to acme screws and is movable relative to such screws 150 and 152. More specifically, as acme screws 150 and 152 rotate, elevator 172 moves up or down, depending on the acme screw direction of rotation. More specifically, and still referring to FIG. 3, elevator 172 is configured to have CRD 60, including a CRD flange 174, partially inserted therethrough. Elevator 172 supports CRD 60 and moves from an uppermost position, as shown in phantom, to a lowermost position. Elevator 172 may also, of course, move from lowermost position to uppermost position for installation of CRD 60.

To move elevator 172 relative to tower, a hand held angle wrench 176 is coupled to drive hex nut 158 of acme screw 150. As angle wrench 176 rotates acme screw 150, timing belt 170 and timing pulleys 166 and 168 also drive acme screw 152 to rotate. As both acme screws 150 and 152 rotate together, elevator 172 moves relative to tower 80.

FIG. 4 is a perspective exploded view with parts cut away of BOS system tower 80. More specifically, and as shown in FIG. 4, a trunnion cart axle 178 is secured to an external surface of tower 80. As described above, axle 178 mates with pillow block 126 of trunnion cart 74 (FIG. 2) to allow tower 80 to rotate relative to cart 74. Axle 178 is bolted to the side of tower 80 and can be bolted to tower 80 at various lengths along tower 80 to adjust the amount of clearance desired above under vessel area floor 68 (FIG. 1). Also, an angle wrench opening 180 is formed at upper section of tower 80. Although not shown in FIG. 4, a similar trunnion axle 178 and angle wrench opening 180 would be attached to and formed in tower 80 on a side of tower 80 opposite axle 178 and opening 180.

An end plate 182 is secured, e.g., welded, at a lowermost section of tower 80. End plate 182 is configured to support acme screw 150 and 152. Mounting blocks 184 and 186 (only block 186 is visible in FIG. 4) for drive screws 150 and 152 are located at the lowermost section of tower 80.

At upper section of acme screw 150, a thrust collar 188 is secured to acme screw 150 by a pin 190. At lower section of acme screw 150, acme screw 150 extends through double row needle roller bearing 162 and is engaged to drive pulley 166 secured to screw 150 by a pin 192. An idler pulley 194 is secured to end plate by a pin 196, sleeve 198 and washer 200. A tensioner pulley 202 also is secured to end plate 182 using a washer 204 and tensioner adjustment bar 206. Washers 208 and 210 and a tensioner adjustment bar screw 212 secure such assembly to end plate.

Elevator 172 is secured to acme screw 150 by a gimbled acme nut support 214. Gimble pins 216 and 218 extends through elevator 172 and into support 214, which is threadedly engaged to acme screw 150. Pins 220 and 222 maintain gimble pins 216 and 218 in place. A bronze acme nut 224 is threadedly engaged to acme screw 150 and is used to more precisely maintain elevator 172 at a proper horizontal position. Gimbled acme nut 224 allows elevator support 214 to become misaligned from side to side without binding and jamming acme screw 150.

Acme screw 152 (not shown in FIG. 4) is coupled to tower 80, elevator 172 and timing belt 170 (FIG. 3) in the same manner as acme screw 150.

Figure 5:
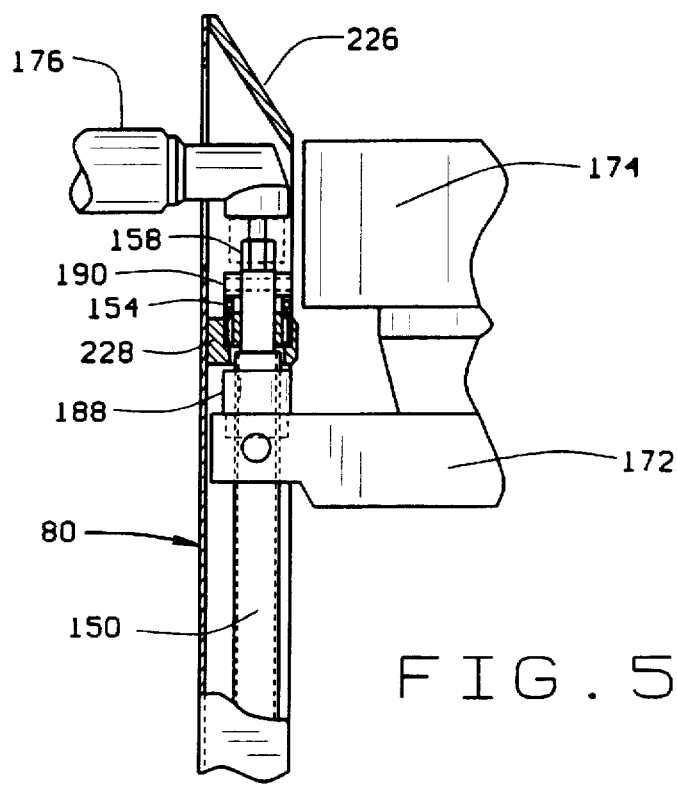
FIG. 5 is a partial cross section side view of an upper section of the bottom open sled system tower.

FIG. 5 is a partial cross section side view of the upper section of BOS system tower 80. As shown in FIG. 5, tower 80 includes an angular lead in section 226 to facilitate positioning a CRD within tower 80. Acme screw 150 extends through combination radial thrust bearing 154 which is housed within a bearing mounting block 228 bolted to tower 80, and through thrust collar 190. This arrangement ensures that acme screw 150 is always in tension, thus increasing stability when turning under load. Drive hex nut 158 at the upper section of acme screw 150 can be engaged by angle wrench 176, and angle wrench 176 drives acme screw 150 as described herein.

Figure 6:
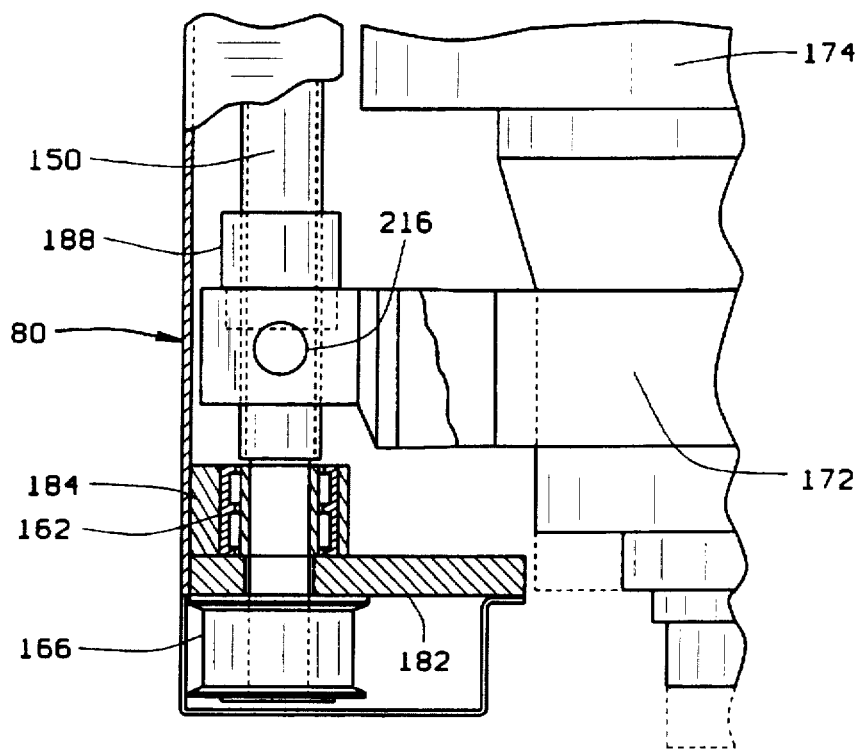
FIG. 6 is a partial cross section side view of a lower section of the bottom open sled system tower.

FIG. 6 is a partial cross section side view of the lower section of bottom open sled system tower 80. As shown in FIG. 6, acme screw 150 extends through double row needle roller bearing 162, housed in mounting block 184, and end plate 182. Screw 150 is coupled to drive, or timing, pulley 166. Acme screw 150 rotates within roller bearing 162 and pulley 166 rotates with acme screw.

Figure 7:
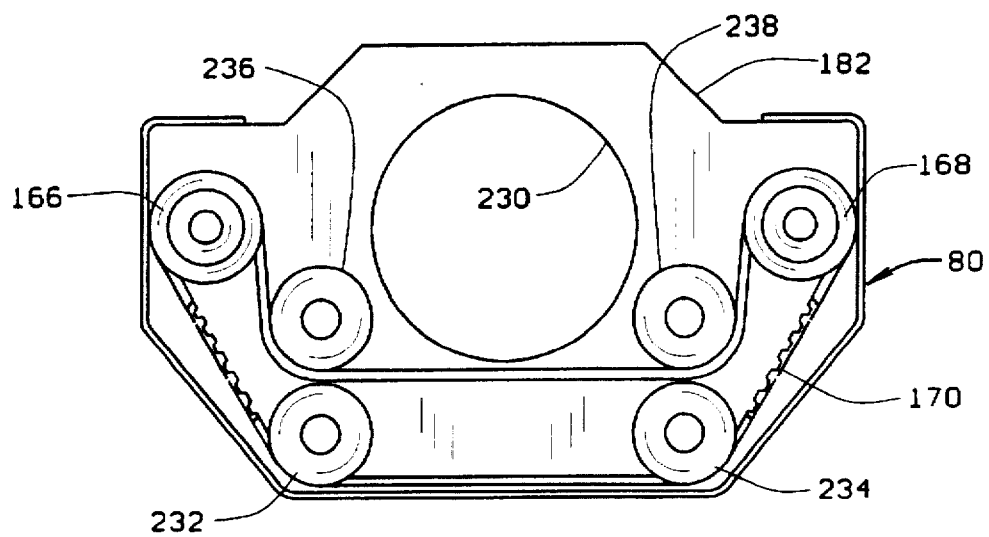
FIG. 7 is an end view of the bottom open sled system tower.

FIG. 7 is an end view of BOS system tower 80 and shows end plate 182 having an end plate cutout 230. End plate cutout 230 is sized so that at least a portion of the CRD (not shown in FIG. 7) can extend therethrough. Timing belt 170 is driven by a pulley assembly which includes drive pulleys 166 and 168, idler pulleys 232 and 234, and tension idler pulleys 236 and 238. Timing belt 170 transmits power and provides synchronization between screws 150 and 152 when either screw 150 or 152 is driven.

Figure 8:
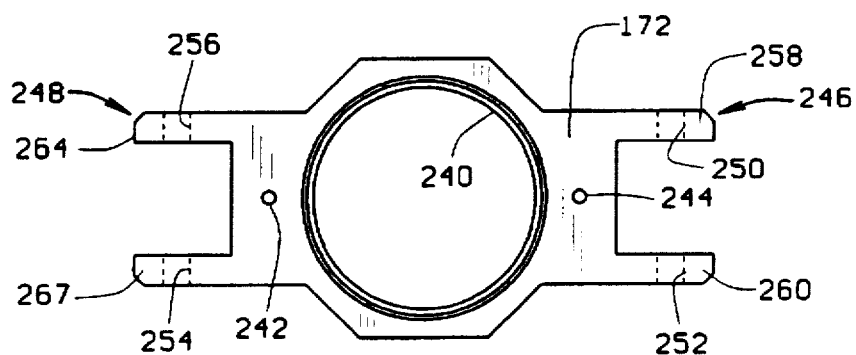
FIG. 8 is a top plan view of an elevator, with parts cut away, of the bottom open sled system tower.

FIG. 8 is a top plan view of elevator 172 with parts cut away. Elevator 172 also includes a CRD cutout 240 which enables a portion of the CRD (not shown in FIG. 8) to extend therethrough. Mounting holes 242 and 244 for bumper stops also are formed in elevator 172. Elevator 172 includes two substantially u-shaped sections 246 and 248 having gimble pin openings 250, 252, 254 and 256 formed in respective legs 258, 260, 262 and 264 thereof.

Figure 9:
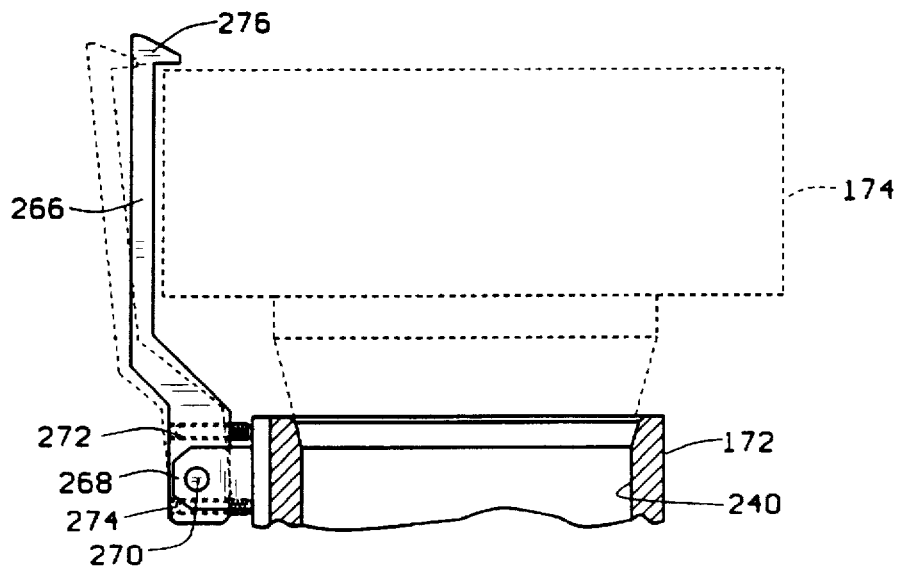
FIG. 9 is a side view of the elevator, with parts cut away, shown in FIG. 8.

FIG. 9 is a side view of elevator 172, with parts cut away, shown in FIG. 8. As shown in FIG. 9, a flange lock bar 266 may be mounted to elevator 172 by a mount 268, pin 270 and set screws 272 and 274. Flange lock bar 266 includes a lip 276 which, when flange lock bar 266 is in its closed position, limits movement of CRD flange 174. In the open position, as shown in phantom, lip 276 does not so limit movement of CRD flange 174.

FIG. 10 is a top view of BOS system tower with some parts cut away. As shown in FIG. 10, a guide roller mount 278 extends into CRD receiving area 280 of tower 80. A tower guide roller assembly 280 is secured to mount 278 by a pin 282. Assembly 280 also includes a guide roller bar 284 having a roller 286 secured thereto by a pin 288. Roller guide assembly 280 is rotatably secured to guide roller mount 278 by pin 282 and is used to assist in locating a CRD within tower 80 when rotated to the horizontal position.

Load transfer bar 104 is slidably engaged to tower 80 by support and pin assemblies 290 and 292. Assemblies 290 and 292 are secured to mounting brackets 294 and 296. Bar 104 is slidable through support assemblies 290 and 292 and is configured to support a CRD at the CRD flange as described hereinafter in more detail.

FIG. 11 is a plan view of bottom open sled system tower end plate 182. As shown in FIG. 11, a cable connector 300 is secured to end plate 182. Acme screw openings 302 and 304 and tensioner pulley slots 306 and 308 also are formed on opposite sides of end plate 182.

Flip-up cam wheels 114 and 116 are secured to end plate 182 by rotatable axles 310 and 312. Flip-up spring loaded cam locks 314 and 316 are secure to each axle 310 and 312, and such locks 314 and 316 cooperate with wheel horizontal stop plates 318 and 320 and lock into the transport position. To move wheels 114 and 116 from the transport position to the non-operative position, as shown in phantom, spring loaded locks 314 and 316 are pressed inward towards wheels 114 and 116.

Extension Tube

FIG. 12 is a side view of extension tube 82 used in connection with BOS system 76 (FIG. 1). As described above, extension tube 82 is attached to hanger brackets 106 and 108 (FIG. 2) on rigid tower 80 and is used to provide the extra throw required to install or remove a CRD. Since the length of rigid tower 80 in the vertical position cannot extend into the shoot-out steel and instrumentation under vessel 54 (FIG. 1), extension tube 82 is used to complete the operation.

Referring specifically to FIG. 12, extension tube 82 includes a substantially cylindrical extension tube body 322 having an extension base 324 secured to body 322 by a dowel pin 326. Split rings 328 and 330, having split ring fingers 332 and 334, are positioned at selected locations along the length of tube body 322 and are used for securing tube 82 to brackets 106 and 108 of tower 80 (FIG. 2). Split rings 328 and 330 are coupled to tube body 322 with clamp bolts. A pivot yoke base 336 also is positioned on tube body 322.

Extension tube 82 also includes a pilot assembly 340 including a pilot socket 342, a pilot body 344 and an extension pilot 346. Pilot socket 342 secures pilot body 344 to extension tube body 322. Pilot body 344 and extension body 322 mate with the lowermost end of a CRD.

4 Wheel Trunnion Cart

Figure 13:
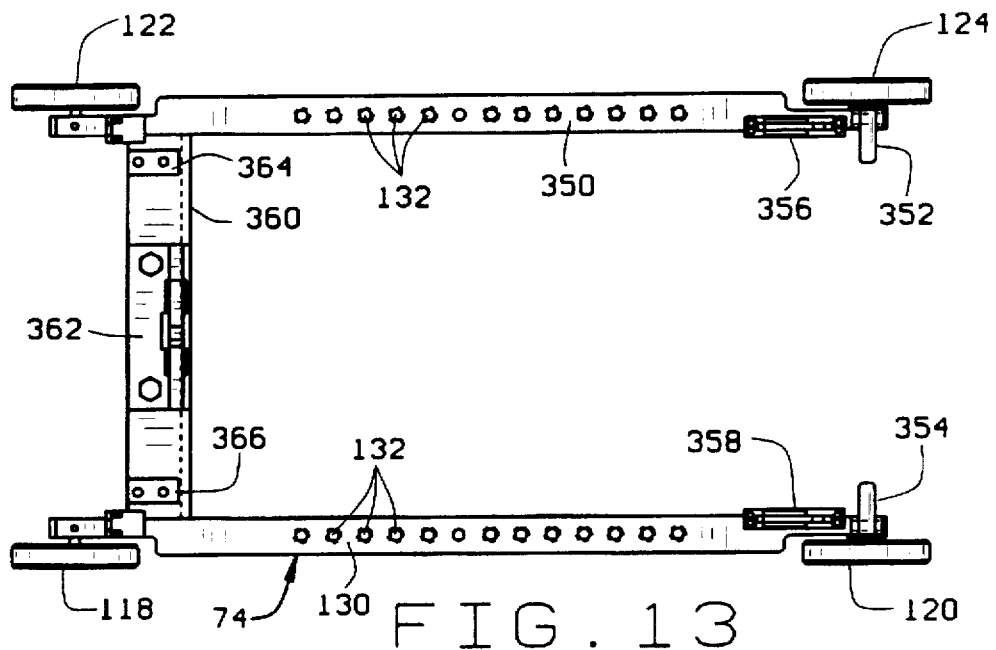
FIG. 13 is a top view of a trunnion cart.

FIG. 13 is a top view of trunnion cart 74 for BOS system 76. Cart 74 includes steel side bars 130 and 350 having a plurality of pillow bracket engagement openings 132 formed therein. Wheels 118, 120, 122, and 124 are connected to each end of side bars 130 and 350. Front wheels 120 and 124 include flip out wheel lock assemblies 352 and 354 and vertical lock assemblies 356 and 358.

A steel angle 360 extends from and between side bars 130 and 350 and is welded thereto. A horizontal transfer lock assembly 362 is mounted to steel angle 360. Also, latches 364 and 366 are secured to cart 74 for engaging to lead cart telescoping arms (not shown), as described hereinafter in more detail.

Figure 14:
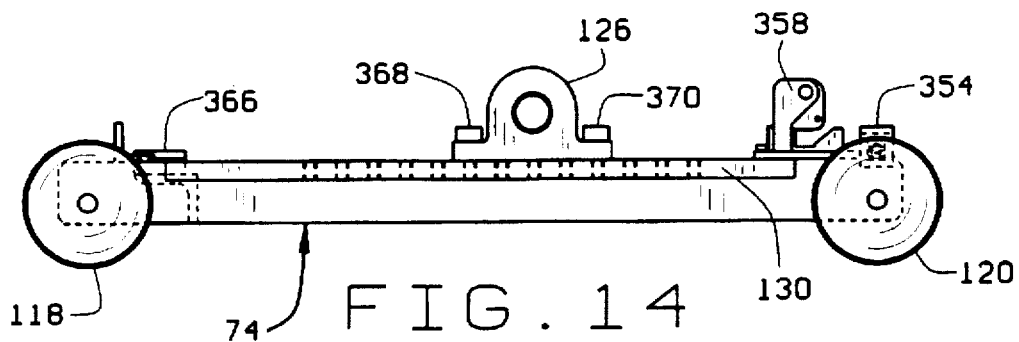
FIG. 14 is a side view of the trunnion cart shown in FIG. 13.

FIG. 14 is a side view of trunnion cart 74 shown in FIG. 13. As shown in FIG. 14, pillow block 126 is mounted to side bar 130 by bolts 368 and 370. The location of pillow block 126 on side bar 130 is adjustable. With respect to vertical latches 356 and 358 (only latch 358 is shown in FIG. 14), when tower 80 is rotated from a horizontal position to a vertical position, an adjustable length lock bar (not shown) is rotated into latches 356 and 358. Latches 356 and 358 automatically lock onto the bar and maintain tower 80 vertical while a CRD is being raised or lowered.

Figure 15:
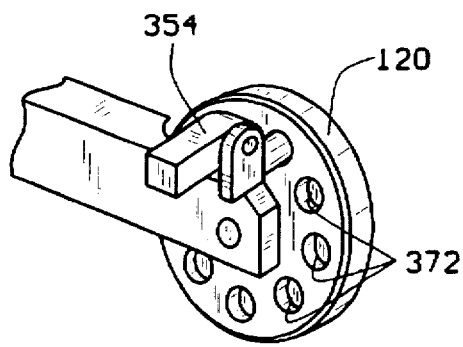
FIG. 15 is perspective view of a wheel and lock mechanism of the trunnion cart shown in FIG. 13.

FIG. 15 is perspective view of wheel 120 of trunnion cart 74 shown in FIG. 13. As shown in FIG. 15, flip out wheel lock 354 mates with any one of a plurality of index openings 372 formed in wheel 120 so that once cart 74 is located in a desired position, lock 354 can be inserted within aligned opening 372 and prevent cart 74 from rolling.

Figure 16:
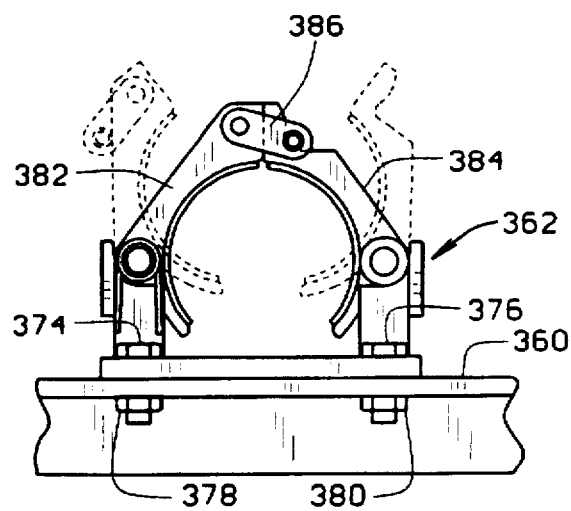
FIG. 16 is a side view of the trunnion cart horizontal transfer lock assembly.

FIG. 16 is a side view of trunnion cart horizontal transfer lock assembly 362. Lock assembly 362 is bolted to cross bar 360 by bolts 374 and 376 and nuts 378 and 380. Interlockable clamp arms 382 and 384 of assembly 362 are movable from an open position, as shown in phantom, to a closed position. A rotatable locking bale 386 maintains clamp arms in the locked position.

When in the locked position, clamp arms 382 and 384 define an opening through which a CRD can extend. More specifically, when tower 80 and a CRD are rotated from the vertical position to the horizontal position, the CRD contacts clamp arms 382 and 384 and causes clamp arms 382 and 384 to close around the CRD. The operator then flips over locking bale 386 to maintain clamp arms 382 and 384 securely in the closed position while the CRD is transported.

Figure 17:
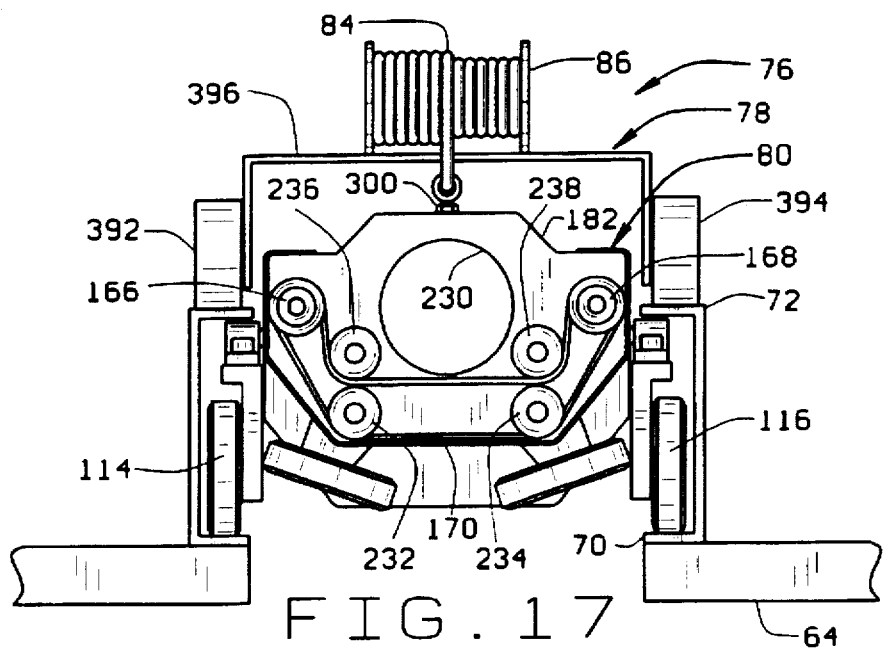
FIG. 17 is an end view of the bottom open sled system.

FIG. 17 is an end view of BOS system 76. As described above, winch cart 78 is located on uppermost rail 72 of CRD equipment platform 64. Winch cart 78, sometimes referred to as upender winch cart, includes wheels 392 and 394 (the two other winch cart wheels are not visible in FIG. 17) which roll on upper rail 72 and a mount 396 for upender winch 86. Cart 78 is locked down onto upper rail 72 by two L-bolts (not shown) which lock on under rail 72. Worm drive cable winch 86 is bolted to mount 396. The same hand held angle wrench used to operate tower elevator (wrench 176 in FIG. 3) is also used to power worm drive winch 86. Since worm drive winch 86 will not back drive, the angle wrench can be removed from winch 86 with no danger of dropping the load.

Operation

Figure 18:
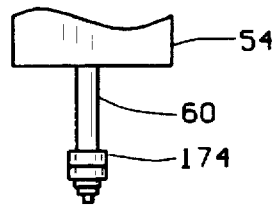
FIG. 18 is a side view illustrating lowering the tower of the bottom open sled system from a vertical position to a horizontal position.
Figure 18:
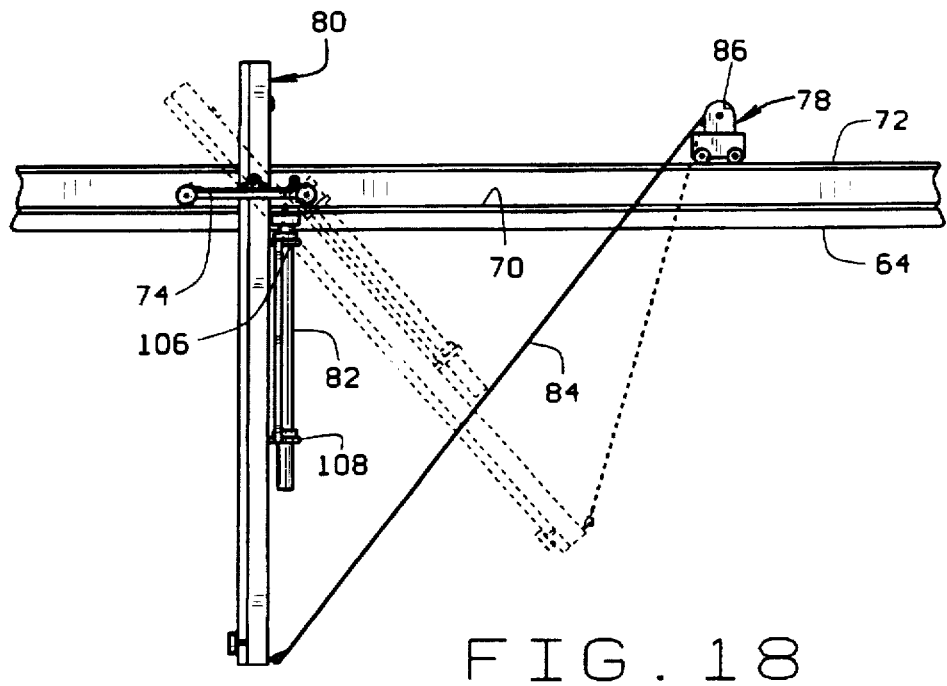

FIG. 18 is a side view illustrating lowering BOS system tower 80 from a horizontal position to a vertical position. More specifically, trunnion cart 74 is located below a CRD 60 and cable 84 of winch 86 is connected to tower 80. Winch 86 then operates to lower the lowermost section of tower 80 between rails 70 of CRD equipment platform 64. As tower 80 is lowered, tower 80 rotates on trunnion axles 178 (FIG. 4) in pillow blocks 126 (FIG. 14) of cart 74.

When tower 80 is rotated to the vertical position, the adjustable length lock bar is rotated into latch plate mechanism 358 (FIG. 14). Latch plate 358 automatically locks onto the bar and maintains tower 80 vertical.

As shown in FIG. 19, elevator 172 having extension tube 82 secured thereto is raised so that tube 82 mates with CRD 60. More particularly, extension tube 82 is swung into position over elevator 172 on hinge brackets 108 and 106 and then set into elevator 172. Hinge brackets 106 and 108 are then rotated away from extension tube 82, and elevator 172 and tube 82 are raised until tube 82 engages and supports the bottom of CRD 60. The CRD flange bolts are then removed, and CRD 60 is lowered with extension tube 82 until CRD flange 174 is positioned at the top end of tower 80. Transfer bar 104 is then slid through mounts 290 and 292 (FIG. 10) under the edge of CRD flange 174. Elevator 172 with extension tube 82 is then lowered until extension tube 82 can be swung out on hanger brackets 106 and 108.

As shown in FIG. 20, elevator 172 is then raised until elevator 172 engages the bottom of CRD 60. CRD 60 is then raised slightly to remove the load off transfer bar 104. Bar 104 is then slid out of position and elevator 172 is lowered until CRD 60 exits the CRD housing, as shown in FIG. 21.

Once elevator 172 is fully lowered and CRD 60 is removed from the CRD housing, the adjustable length lock bar is rotated out of latch plate mechanism 358 so that elevator 80 can be rotated to a horizontal position by upender winch 86. The tower and CRD combination horizontal position is shown in FIG. 22.

Also shown in FIG. 22 is a lead cart 400 which may be used to assist in removing CRD 60 from under vessel area 62 (FIG. 1). More specifically, lead cart 400 includes a clamp 402 which is locked onto the upper end of CRD 60 for transport. Telescoping arms 404 (only one arm is shown in FIG. 22) attach to lead cart 400 at one end and latch to trunnion cart 74 at other end. Lead cart 400 has four wheels 406 (two wheels 406 are visible in FIG. 22). The purpose of lead cart 400 is to start the top end of CRD 60 onto inclined transfer chute 92 (FIG. 1), thus preventing CRD 60 from nosing into the bottom of transfer chute 92.

The BOS system, or CRD exchange system, described above enables raising and lowering CRDs in a safe and controlled manner so that the CRDs are not dropped or allowed to contact adjacent equipment in a manner that could cause damage. In addition, CRDs are safely rotated from vertical and horizontal positions, and the CRDs are secured to removal equipment for transport out of the under vessel area. These activities can be accomplished quickly and efficiently so as to facilitate reducing radiation exposure and in a manner which requires a minimum number of personnel. Further, the combined length of the tower and CRD is no longer than the CRD, which enables rotation of the CRD tower combination even in plants with limited floor clearance. Moreover, by eliminating the elevator drive motor, problems associated with having to operate and maintain such drive motors are substantially eliminated.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. An integrated and removable control rod drive exchange apparatus for removing and installing control rod drives in a nuclear reactor, the reactor including a reactor pressure vessel, an under vessel area located below the reactor pressure vessel, and an equipment platform between the under vessel area and the basement, said apparatus comprising:

a tower forming a control rod drive receiving area;

a drive assembly comprising first and second acme screws extending substantially the length of said tower, said first and second acme screws mounted to opposite sides of said tower, each of said acme screws coupled to a drive pulley at one end thereof, said drive assembly further comprising a timing belt extending around said drive pulleys, so that as said first acme screw is rotated said second acme screw rotates therewith, and wherein said first acme screw is rotated with a hand held angle wrench;

an elevator coupled to said acme screws and movable relative to said acme screws, said elevator configured to engage a portion of the control rod drive and to substantially support the control rod drive; and a trunnion cart engaged to said tower so that said tower is rotatable relative thereto;

said integrated apparatus operable for removing a control rod drive from the reactor pressure vessel and movable with the control rod drive so that said integrated apparatus and the control rod drive are movable together out from the under vessel area.

2. Apparatus in accordance with claim 1 wherein said tower is constructed from stainless steel.

3. Apparatus in accordance with claim 1 wherein the length of said tower is no greater than the length of the control rod drive.

4. Apparatus in accordance with claim 1 further comprising at least one bracket secured to said tower, said bracket configured to support an extension tube, said bracket rotatable relative to said tower so that the extension tube can be moved in and out of the control rod receiving area.

5. Apparatus in accordance with claim 1 wherein said elevator is coupled at opposite ends to gimbled supports, said gimbled supports threadedly engaged to said acme screws.

6. Apparatus in accordance with claim 1 wherein at least one of said acme screws has a hex nut at a first end thereof.

7. Apparatus in accordance with claim 7 wherein said drive assembly further comprises at least one tensioner idler and at least one idler pulley.

8. Apparatus in accordance with claim 1 wherein said elevator includes a control rod drive cutout portion so that a portion of the control rod drive can extend therethrough.

9. Apparatus in accordance with claim 1 further comprising mounting blocks secured at one end of said acme screws to said tower, radial thrust bearings mounted at least partially within said mounting blocks and said acme screws extending therethrough.

10. Apparatus in accordance with claim 1 further comprising a mounting block secured at one end of said acme screw to said tower, a double row needle roller bearing mounted at least partially within said mounting block and said acme screw extending therethrough.

11. Apparatus in accordance with claim 1 wherein said trunnion cart comprises at least one pillow block and said tower has a trunnion axle secured to an exterior surface thereof, said trunnion axle engagable to said pillow block and rotatable therein.

12. Apparatus in accordance with claim 1 wherein said trunnion cart further comprises a vertical lock latch plate for engaging to a bar for maintaining said tower in a vertical position.

13. Apparatus in accordance with claim 1 wherein said tower further comprises at least one flip-up wheel at one end thereof, said wheel movable from a transport position to an inoperative position.

14. Apparatus in accordance with claim 1 further comprising an extension tube, said extension tube mountable on said elevator and having one end configured to engage a control rod drive.

15. Apparatus in accordance with claim 1 further comprising a lead cart, said lead cart comprising a clamp for contacting a portion of the control rod drive and an extension for extending from said lead cart to said trunnion cart.

16. Apparatus in accordance with claim 1 further comprising an upender winch cart comprising an upender winch and cable, said upender winch operable to move said tower from a vertical to a horizontal position.

17. A bottom open sled system for exchanging control rod drives in a nuclear reactor, said bottom open sled system comprising:

a tower forming a control rod drive receiving area, a drive assembly comprising at least one acme screw extending substantially the length of said tower and mounted within said receiving area, an elevator coupled to said acme screw and movable relative to said acme screw, said elevator configured to engage a portion of the control rod drive and to substantially support the control rod drive, said drive assembly secured to and removable from the reactor with said tower, and wherein said acme screw is rotated with a hand held angle wrench;

a trunnion cart, said trunnion cart engaged to said tower so that said tower is rotatable relative thereto;

said bottom open sled operable for removing a control rod drive from the reactor pressure vessel and movable with the control rod drive so that said sled and the control rod drive are movable together out from an under vessel area.

18. A bottom open sled system in accordance with claim 17 wherein said trunnion cart comprises at least one pillow block and said tower has a trunnion axle secured to an exterior surface thereof, said trunnion axle engagable to said pillow block and rotatable therein, said trunnion cart further comprising a vertical lock latch plate for engaging to a bar for maintaining said tower in a vertical position.

19. A bottom open sled system in accordance with claim 17 wherein said tower further comprises at least one flip-up wheel at one end thereof, said wheel movable from a transport position to an inoperative position.

20. A bottom open sled system in accordance with claim 17 further comprising an extension tube, said extension tube mountable on said elevator and having one end configured to engage a control rod drive.

21. A bottom open sled system in accordance with claim 17 further comprising a lead cart, said lead cart comprising a clamp for contacting a portion of the control rod drive and an extension for extending from said lead cart to said trunnion cart.

22. A bottom open sled system in accordance with claim 17 further comprising an upender winch cart comprising an upender winch and cable, said upender winch operable to move said tower from a vertical to a horizontal position.

23. A bottom open sled system in accordance with claim 17 wherein the length of said tower is no greater than the length of the control rod drive.

24. A bottom open sled system in accordance with claim 17 wherein first and second acme screws extend substantially the length of said tower, said first and second acme screws mounted to opposite sides of said tower, said elevator coupled at opposite ends to gimbled supports, said gimbled supports threadedly engaged to said acme screws.

25. A bottom open sled system in accordance with claim 24 wherein at least one of said acme screws has a hex nut at a first end thereof, each of said acme screws coupled to a drive pulley at one end thereof, said drive assembly further comprising a timing belt, so that as said first acme screw is rotated said second acme screw rotates therewith, said drive assembly further comprising at least one tensioner idler and at least one idler pulley.

26. A method for moving a control rod drive relative to a reactor pressure vessel using a bottom open sled system, the bottom open sled system including a tower forming a control rod drive receiving area, a drive assembly including at least one acme screw extending substantially the length of the tower and mounted within the receiving area and wherein said acme screw is rotated with a hand held angle wrench, an elevator coupled to the acme screw and movable relative to the acme screw, the elevator configured to engage a portion of the control rod drive and to substantially support the control rod drive, the drive assembly secured to and removable from the reactor with the tower, the system further including a trunnion cart engaged to the tower so that the tower is rotatable relative thereto, an upender winch wherein said upender winch is mounted separate and apart from said tower, an extension tube, said method comprising the steps of:

aligning the tower in a vertical position with the control rod drive;

positioning the extension tube on the elevator;

raising one end of the extension tube into contact with the end of the control rod drive;

disengaging the control rod drive so that the elevator substantially supports both the extension tube and the control rod drive;

lowering the elevator so that the at least a portion of the control rod drive extends along the length of the tower;

rotating the tower from the vertical position to a substantially horizontal position using the upender wench cart; and removing the bottom open sled system and the control rod drive from within the reactor wherein said separately mounted upender winch remains within the reactor.

27. A method in accordance with claim 26 wherein aligning the tower with the control rod drive comprises the steps of:

rolling the trunnion cart on the rails on the control rod drive equipment platform in the nuclear reactor to a position substantially below the control rod drive;

coupling one end of the winch cable to one end of the tower; and lowering the one end of the tower below the control rod drive equipment platform by paying out cable from the upender wench so that the tower rotates relative to the trunnion cart.

28. A method in accordance with claim 26 further comprising the steps of:

lowering the control rod drive so that the control rod drive flange contacts a flange support bar engaged to the tower;

continuing to lower the elevator so that the control rod drive is substantially supported by the flange support bar;

removing the extension tube from the elevator; and raising the elevator into contact with the control rod drive.

* * * * *